（12） United States Patent
Wilke et al.

(10) Patent No.: US 8,973,814 B2
(45) Date of Patent: Mar. 10, 2015

(54) METHOD FOR THE VERIFIABLE DELIVERY OF AN ARTICLE

(75) Inventors: Wolf-Stephan Wilke, Constance (DE); Michael Zettler, Allensbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/817,574

(22) PCT Filed: Aug. 9, 2011

(86) PCT No.: PCT/EP2011/063659
§ 371 (c)(1),
(2), (4) Date: Feb. 19, 2013

(87) PCT Pub. No.: WO2012/022654
PCT Pub. Date: Feb. 23, 2012

(65) Prior Publication Data
US 2013/0146656 A1    Jun. 13, 2013

(30) Foreign Application Priority Data

Aug. 16, 2010  (DE) .......................... 10 2010 034 356

(51) Int. Cl.
*G06F 17/00*    (2006.01)
*B07C 3/14*    (2006.01)
(Continued)

(52) U.S. Cl.
CPC . *G06F 17/00* (2013.01); *B07C 3/14* (2013.01); *G07B 17/00661* (2013.01); *G06Q 10/08* (2013.01); *G06Q 10/083* (2013.01);
(Continued)

(58) Field of Classification Search
CPC ....... G06Q 10/08; G06Q 10/00; G06Q 10/06; G06Q 10/0631; G06Q 10/06311; G06Q 10/063116; G06Q 10/06312; G06Q 10/06316; G06Q 10/08355; G06Q 99/00; G07B 17/00024; G07B 2017/0004; G07C 9/00158
USPC ....................................................... 235/375
See application file for complete search history.

(56) References Cited

U.S. PATENT DOCUMENTS 5,852,813  A    12/1998  Guenther et al.
6,577,749  B1    6/2003  Rosenbaum
(Continued)

FOREIGN PATENT DOCUMENTS

CA    2400391  A1    7/2002
CN    1832815  A    9/2006
(Continued)

*Primary Examiner* — Thien M Le
*Assistant Examiner* — Tae Kim
(74) *Attorney, Agent, or Firm* — Laurence A. Greenberg; Werner H. Stemer; Ralph E. Locher (57) ABSTRACT

A method delivers an item to a target point. The item is a distinguishable item. A data set for the item is generated in a central data storage unit. This data set contains identification feature values for the item. The item is conveyed to a predetermined target point. At the target point, the item is provided, at least temporarily, with an optically detectable delivery marking. At least one computer-accessible image of the item is generated by a portable image recording device. The image shows the item together with the delivery marking. With the aid of the image, the data set for the item, which is stored in the central data storage unit, is determined. The data set is supplemented with a computer-accessible marking of the delivery.

9 Claims, 3 Drawing Sheets

(51) Int. Cl.
*G07B 17/00* (2006.01)
*G06Q 10/08* (2012.01)
*G06Q 50/28* (2012.01)
*G06Q 50/30* (2012.01)
*G06Q 50/32* (2012.01)

(52) U.S. Cl.
CPC ............ *G06Q10/0833* (2013.01); *G06Q 50/28* (2013.01); *G06Q 50/30* (2013.01); *G06Q 50/32* (2013.01); *G07B 2017/00443* (2013.01); *G07B 2017/0062* (2013.01); *G07B 2017/00709* (2013.01)
USPC ....................................................... 235/375

(56) References Cited

U.S. PATENT DOCUMENTS

| | | | |
|---|---|---|---|
| 6,587,572 | B1 | 7/2003 | Suchenwirth-Bauersachs et al. |
| 6,888,084 | B1 | 5/2005 | Bayer |
| 7,253,537 | B2 | 8/2007 | Weng et al. |
| 8,050,794 | B2 | 11/2011 | Berger et al. |
| 2003/0101147 | A1* | 5/2003 | Montgomery et al. ....... 705/402 |
| 2005/0154685 | A1* | 7/2005 | Mundy et al. ................. 705/404 |
| 2005/0289008 | A1 | 12/2005 | Olivier et al. |
| 2005/0289060 | A1 | 12/2005 | Abumehdi et al. |
| 2006/0138223 | A1* | 6/2006 | Schar ............................ 235/384 |
| 2006/0287870 | A1 | 12/2006 | Mayer et al. |
| 2007/0000818 | A1 | 1/2007 | Delitz et al. |
| 2009/0074558 | A1 | 3/2009 | Berger et al. |
| 2010/0211214 | A1* | 8/2010 | Blasche ........................ 700/224 |

FOREIGN PATENT DOCUMENTS

| | | |
|---|---|---|
| CN | 1836247 A | 9/2006 |
| DE | 10064529 C1 | 1/2002 |
| DE | 602005000234 T2 | 8/2007 |
| DE | 102008017190 A1 | 3/2009 |
| DE | 102008017191 A1 | 3/2009 |
| EP | 1222037 B1 | 6/2003 |
| EP | 1450144 A2 | 8/2004 |
| EP | 1578055 B1 | 11/2006 |
| EP | 1796259 A2 | 6/2007 |
| EP | 2 037 419 A1 | 3/2009 |
| EP | 2202692 A1 | 6/2010 |
| GB | 2375867 B | 12/2003 |
| WO | 03058789 A1 | 7/2003 |
| WO | 2005/024679 A1 | 3/2005 |
| WO | 2009/013209 A1 | 1/2009 |

* cited by examiner

METHOD FOR THE VERIFIABLE DELIVERY OF AN ARTICLE

BACKGROUND OF THE INVENTION

Field of the Invention

The invention relates to a method for transporting an article to a prescribed destination and delivering it at this destination. This article is a distinguishable article, e.g. an important mail item.

In the case of mail packages, registered letters or other important mail items, for example, it is desirable to be able to verify that the article is actually transported to a prescribed destination and delivered there to an authorized recipient.

By way of example, the "registered mail with return receipt" product reveals the practice of the recipient using a paper-based document to confirm receipt and the document being returned with the confirmation as a mail item to the sender.

The delivery of mail packages reveals that a portable device is used to register a machine-readable code on the package. Furthermore, a signature from a recipient is registered. This signature is provided on a touch-sensitive input panel of the device.

WO 2009/013209 A1 and US 2010/0211214 A1 describe a method and an apparatus for monitoring the transport of an article. The article is a mail item, for example. The invention is used in order to verify to the sender or to the recipient that the article has been delivered, for example. The article passes through a sorting installation. The sorting installation measures a plurality of prescribed optically registerable features, for which purpose the sorting installation evaluates a computer-accessible depiction of the article. The values which these prescribed features assume for this article provide a first feature value vector. This first feature value vector is stored in a central data memory, specifically as part of a data record for the transported article. At the conclusion of the transport, the values which the prescribed features assume for this article are measured again. In one refinement, a mailman uses a portable image recorder to produce a depiction of the delivered article. During the fresh measurement, this depiction is evaluated. Furthermore, the time at which the transport was concluded is measured. The feature value vector produced during the fresh measurement is used to look for the data record for the article in the central data memory and to augment it by an identifier for the measured time. In one refinement, the time and the depiction are transmitted by the portable image recorder to a central computer, which evaluates the depiction in order to produce the further feature value vector.

EP 1578055 B1, DE 60 2005 000234 T2 and US 2005/0289060 A1 describe a method and an arrangement for delivering articles and securely consulting a delivery confirmation ("secure consultation of delivery receipts"). The arrangement comprises a central computer 10 having databases 22, 24, a PC 14 and a portable device ("terminal") 16, which are connected to one another by means of data networks. A mailman from a transport service provider delivers an article to a recipient. In the process, the mailman uses the terminal 16 to produce a delivery confirmation ("delivery receipt") and transmits it wirelessly to the central computer 10. The delivery confirmation comprises a digital depiction and further information. The depiction may show the article and may contain a confirming stamp from the recipient. The further information may include the name of the recipient, the location and time of the delivery and details relating to the articles delivered. The confirmation of receipt ("message 30") is encrypted for the first time during the transmission using a private key in order to produce a signature S1. A session key is used to produce two "encrypted data E1, E2" and to transmit them to the central computer 10. Various further methods of encryption are described. The transmitted delivery confirmations are stored in databases 22, 24. From the PC 14, it is possible to access these stored delivery confirmations.

These three laid-open specifications refer expressly to US 2005/0289008 A1. US 2005/0289008 A1 provides a more detailed description of the terminal 16 carried by the mailman and the use thereof for delivering an article.

This terminal 16 has a processor 160, a data memory 16, a bar code reader 164, a touch-sensitive screen 116, an operating element ("stylus") 168, a data transmission unit ("radio modem") 170, an image recorder ("digital image sensor") 172 and a voice recording unit ("digital voice recorder") 174. In one refinement, the mailman uses the image recorder 172 to produce a shot of an article which is being delivered, e.g. of a package which has been damaged during transport.

GB 2375867 A describes a system and a method for "mail delivery verification". A database 1 is used to store address information 16 and also a depiction ("image 15") of a registered recipient for mail items. Instead of a depiction, it is also possible to store a reproduction of a signature from the recipient. An e-mail to a registered recipient reaches the apparatus in FIG. 2. A physical mail item for this recipient is produced, for which purpose the e-mail is evaluated. A personalized envelope ("envelope 7") with the message for this recipient is produced, cf. FIG. 4. The envelope 7 shows the depiction 15 and also the address information 16 from the database 1. The envelope 7 is transported to the prescribed address 16. There, a verification step is performed, cf. FIG. 3. This involves the depiction 15 on the envelope 7 being compared with the recipient who has been found there. If the signature of the recipient is reproduced on the envelope 7 instead of a depiction 15, this reproduction is compared with a signature provided by the recipient who has been found. Only in the event of an adequate match is the mail item 7 handed over to the recipient (step 13), otherwise a prescribed method ("non-delivery protocol 14") is carried out.

EP 2037419 A1 describes a method for transporting an article to a prescribed destination. During the transport, a depiction of the article is produced. Furthermore, a parameter of the article is measured, e.g. the weight. A data record for this article is produced. This data record comprises the depiction and the parameter value. The data record is blocked against manipulation.

BRIEF SUMMARY OF THE INVENTION

The invention is based on the object of providing a method for transporting an article to a destination and delivering it verifiably at this destination and only requiring a simpler portable device than in the case of known methods for verifying the delivery.

The object is achieved by a method having the features of the claims. Advantageous refinements are specified in the subclaims.

The method according to the solution transports an article to a prescribed destination and delivers it verifiably at this destination.

The destination is prescribed. In addition, at least one optically registerable identification feature is prescribed. It is possible for a plurality of identification features to be prescribed. The value of the single identification feature or the values of the identification features together identify the article. The method according to the solution comprises the following steps:

A data record for the article is produced. This data record for the article comprises for each prescribed identification feature a respective coding for that value which this identification feature assumes for the article that is to be delivered.

The data record produced is stored in a central data memory.

The article is transported to the prescribed destination.

At the destination, the article is at least intermittently provided with an optically registerable delivery identifier. This identifier verifies the delivery of the article at the destination.

A portable image recorder is used to produce at least one computer-accessible depiction of the article. This depiction is produced such that the depiction shows not only the article but additionally the delivery identifier.

For each prescribed identification feature, it is ascertained what value the identification feature assumes for this delivered article. For this ascertainment, the at least one computer-accessible depiction which has been produced during the delivery of the article is evaluated.

The at least one ascertained identification feature value is used to ascertain that data record in the central data memory which has previously been produced for this article and stored. The ascertained data record is augmented by a computer-accessible identifier indicating that the article has been delivered. This augmenting stored identifier is produced by using the depiction with the delivery identifier. This depiction has been produced by the portable image recorder and transmitted from the portable image recorder to the central data memory.

The method according to the solution requires only a portable image recorder with a data memory, e.g. a digital camera as the portable device, as a portable device which needs to be available when the article is delivered at the destination. This portable image recorder is lighter and smaller than portable devices which are used today for the delivery of articles. Furthermore, it is possible to use commercially available digital cameras, and special portable devices which are manufactured specifically for the verifiable delivery of articles and are therefore more expensive are not required. The advantages of large piece numbers ("effects of scale") for the portable image recorder can be used by virtue of the invention.

The portable image recorder requires no keys and no touch-sensitive input panel, because although it is possible, and in some refinements also useful, to input characters into the portable device, this is not necessary. It is sufficient to have an operating element in order to initiate the production of a depiction. Any camera has such an operating element.

The delivery identifier is put directly onto the article. This reduces the risk of the delivery identifier being associated with an incorrect article.

The invention avoids the need to produce a separate paper-based delivery identifier and to transmit it to a control center after the article has been delivered. Instead, the delivery identifier is shown in the at least one computer-accessible depiction of the delivered article.

In addition, the invention eliminates the need for the step of setting up an electronic communication link between the recipient and the sender or between the recipient and the carrier transporting the article and uses this communication link to transmit a protected message which verifies the delivery of the article.

The verification of the delivery is available immediately after the portable image recorder has produced the shot of the article. Producing this shot takes just an instant. The step of providing the article itself with the delivery identifier also requires only a small amount of time. Hence, the invention allows more rapid verifiable delivery of an article than the known method. This verification is contained in the computer-accessible depiction of the delivered article.

Although the invention allows a depiction of the article to be transmitted from the portable image recorder to the central data memory in encrypted and/or signed form, it does not require any such encryption or any signing prior to the transmission. Unencrypted data transmission is also made possible. Instead, the delivery is verified by means of the delivery identifier in the depiction.

The invention allows, but does not require, the prior creation of a database with data records for registered recipients and use of entries in this database in order to verify the delivery. By virtue of the invention, it is instead also possible to perform and verify the delivery of the article without such a database. It is therefore also possible to deliver an article to a recipient who is not registered.

In one refinement, the delivery identifier used is a signature which is provided by a recipient who therefore confirms receipt of the article. This signature may be a handwritten signature on a surface of the article. The recipient signs directly on the surface of that article which the recipient then receives. The recipient does not need to sign on a document which the recipient then hands over. There is usually more space available for signing on the article itself than on a touch-sensitive screen of a portable device, for example. It is obvious to what the signature from the recipient relates.

In one modification, the recipient signs on a form which is initially separate from the article and can be placed onto a table, for example. The form may contain an article identifier and also details relating to the recipient and/or to the destination. The signed form is affixed to the article. The depiction shows the article to which the signed form is affixed. In one refinement, the recipient keeps the signed form.

In one refinement, the recipient places a personal document, e.g. his identity card or his driver's license, onto the article or holds it on a surface of this article as a delivery identifier. The computer-accessible depiction of the surface is produced such that the depiction shows the article this personal document. The depiction of the personal document in the depiction of the article is already adequate as a delivery identifier. It is possible, but not necessary, for a recipient to additionally sign on a surface of the article or on a separate form. In one refinement, the article is provided with a clear machine-readable article identifier before the article reaches the destination. This article identifier distinguishes the article from all other articles which a carrier transports within a period of time, and has the form of a bar code or a character string which can also be read by a human being, for example. The article identifier on the article can be used to control the transport of the article to the destination, e.g. by virtue of the article identifier being read and the central data memory being searched for the data record of this article, and transport-related information for the article being read from the ascertained data record. The at least one depiction which is produced when the article is delivered shows this article identifier. The article identifier is ascertained by automatically evaluating the depiction using "optical character recognition" (OCR) or "bar code reading". This identifies the article. This article identifier is used to ascertain the data record for the article.

Another refinement avoids having to provide the article with an article identifier. An article identifier requires, moreover, print material, e.g. printer ink, and/or a tag to be put onto an article. The other refinement dispenses with print material and tags. Furthermore, an article identifier is sometimes not wanted on an article. Therefore, the article is identified using a feature value vector instead. At least one identification feature is prescribed. Preferably, a plurality of identification features are prescribed which can be registered optically. By evaluating the depiction of the article, it is ascertained for each prescribed identification feature what value this identification feature assumes for the article. This produces an identification feature value vector. In one embodiment of this refinement with the feature value vector, the article is provided with an identifier for the destination to which the article needs to be transported. This destination identifier acts as a feature value. However, it is possible that a plurality of articles need to be transported to the same destination within a short period of time. Therefore, the article is additionally provided with a distinguishing identifier. This identifier distinguishes the article from all the other articles which need to be transported to the same destination, but not necessarily from all the articles which need to be transported within a period of time. The feature value vector, which comprises the combination of destination identifier and article identifier, identifies the article clearly. The article identifier is preferably machine-readable.

In one refinement, the data record for the article is augmented by that depiction which has been produced during the delivery of the article and which shows the article together with the delivery identifier. This depiction can be used to later verify that the article has been delivered. Preferably, the data record for the article is blocked against subsequent alterations such that the depiction or other information in the data record cannot subsequently be altered. Methods for blocking a data record against manipulation are described in EP 1450144 A2 and EP 2037419 A1, for example. As a result, the data record is suitable for later verifying that the article has been delivered.

In one refinement, the portable image recorder has an output device having a screen. When the depiction of the delivered article has been produced, this screen is used to display an article identifier with which the article is provided and which has been deciphered by evaluating the depiction. The deciphering can be performed in the portable image recorder itself or in a control center. Since the article identifier is presented on the screen, it is immediately possible to establish whether the article identifier has been deciphered correctly or erroneously. If necessary, it is possible to produce a further depiction of the article with the delivery identifier. This refinement reduces the risk of the article identifier being deciphered incorrectly and this not being recognized.

In one refinement, the depiction which has been produced during the delivery of the article is transmitted from the portable image recorder to the central data memory directly and by wireless data transmission. As a result, the depiction is available for further evaluations immediately after the delivery. In another refinement, the depiction is first stored in a data memory of the image recorder. At a later time, the stored depiction is transmitted to the central data memory. This refinement allows the depiction to be transmitted by wire, which reduces the risk of data losses. The two refinements can be combined. By way of example, an attempt is first made to transmit the depiction wirelessly. If this is unsuccessful or does not succeed without error, the depiction is stored and is later transmitted by wire.

In one refinement, the article is delivered together with further articles in a single transport process. Every further article is also transported to its respective destination in this transport process, the destinations possibly being different. The transport process information regarding which articles are being delivered in this transport process is ascertained and stored. This transport process information is used in order to considerably restrict the search space when searching the central data memory for the data record for the article. This reduces the search time and the risk of an incorrect data record being found. The invention is described below with reference to an exemplary embodiment, where:

DESCRIPTION OF THE INVENTION

In the exemplary embodiment, the invention is used in order to be able to verify that mail items have been delivered. These mail items are mail packages, items sent by registered mail, mail items with mail delivery certificates or other important mail items, for example. The mail items are transported by a carrier which is asked to verify that they have been delivered. The carrier uses the method according to the solution in order to verify to the sender or a third party that the mail item has been delivered. By way of example, the sender requires this verification in order to provide legally valid verification of the delivery of the mail item on a particular day and to a particular recipient.

Figure 1:
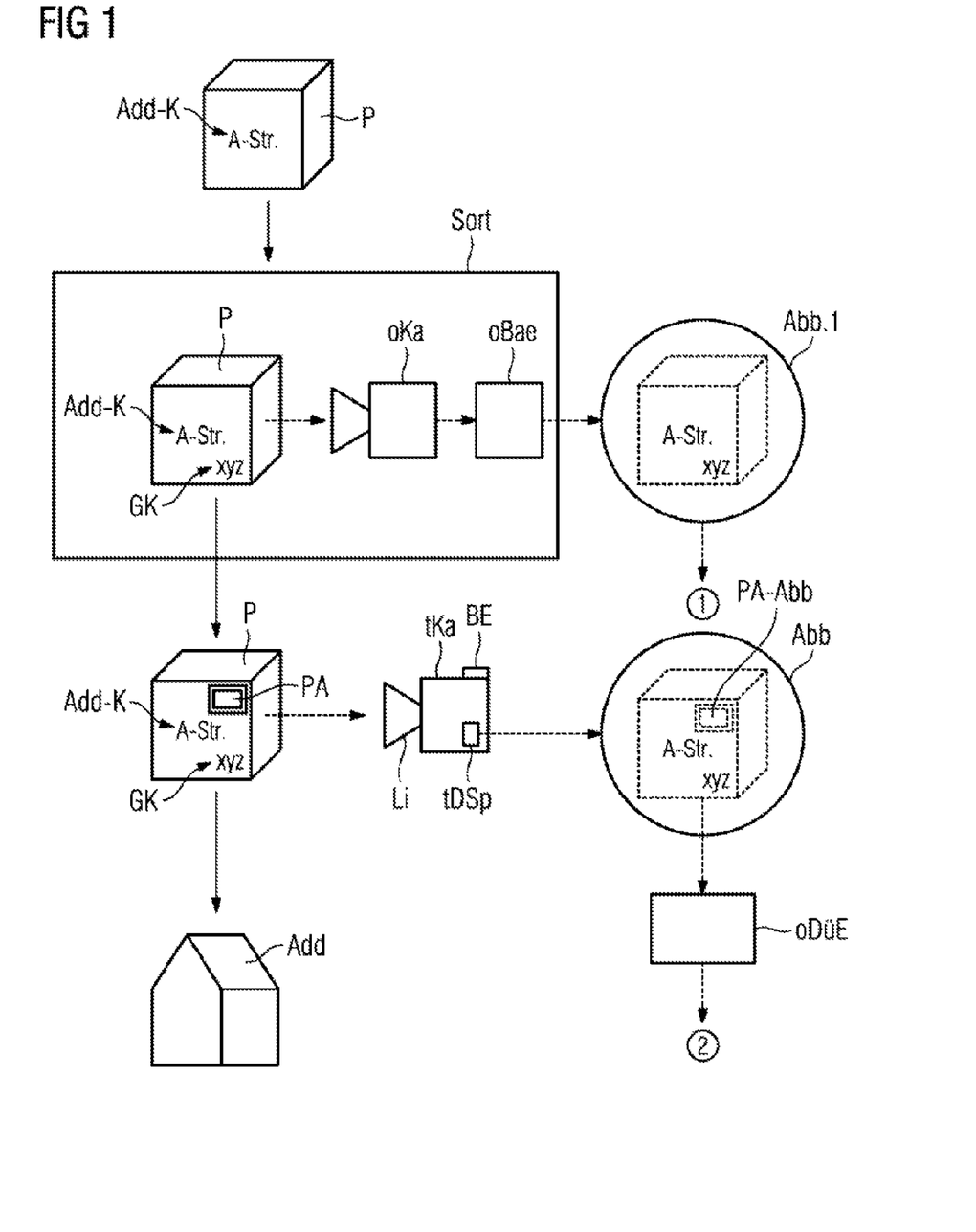
FIG. 1 schematically shows an exemplary embodiment of the method according to the solution, in which a package is being delivered.

FIG. 1 schematically shows an exemplary embodiment of the method according to the solution. A mail package P is intended to be transported to a destination address Add and handed over to an authorized recipient there. The package P is provided with an identifier Add-K for this destination address Add (recipient, postal address). In the exemplary embodiment, the mail item P is provided with an identifier Add-K for a recipient to whom the mail item is intended to be transported. This identifier comprises the name and the postal destination address of the recipient.

The mail item P is handed over to the carrier. In one refinement, the mail item P contains an endorsement. The endorsement stipulates particularly what the mailman is intended to do if the mailman does not find the recipient of the package.

The mail item P then passes through a sorting installation Sort at least once. This sorting installation Sort is connected to a central data memory Ds. A data record Ds for the mail item is created and is stored in the central data memory Z-Db. This data record Ds comprises an internal identifier iK for the mail item and also preferably a coding for that time T1 at which the mail item passes through the sorting installation.

In the example in FIG. 1, the package P passes through the sorting installation Sort. A registration unit RegE in the sorting installation Sort creates a data record Ds for the package P. This data record Ds comprises an internal identifier iK having the value "P123" for the package P. The data record Ds is stored in a central database Z-Db. By virtue of a data record Ds for the package P being produced and stored, the mail item is registered in the central database Z-Db.

Figure 2:
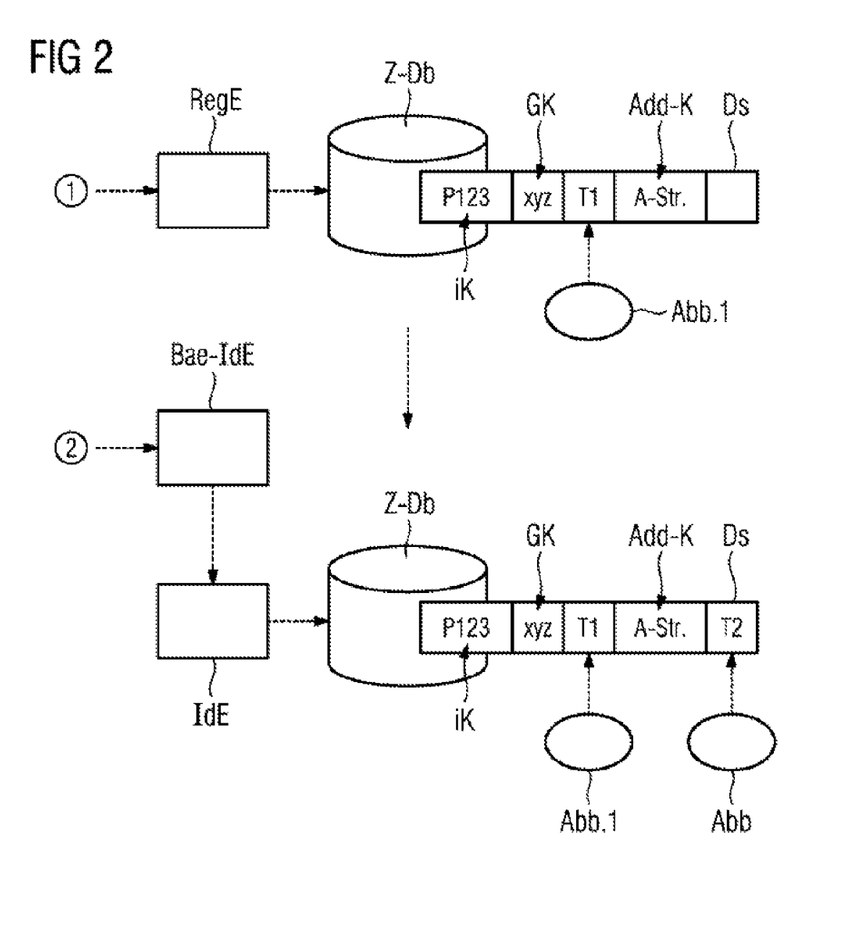
FIG. 2 schematically shows the central database and the data record for the mail item from FIG. 1.

FIG. 2 schematically shows how the data record Ds for the mail item P alters in the central database Z-Db. The package P is provided with the article identifier GK. This article identifier GK has the value "xyz". The data record Ds is used to store a coding for this article identifier GK. The data record Ds comprises a coding for that time at which the sorting installation Sort produced the depiction Abb.1 of the package P as a time stamp T1. The figures show material flows by means of solid arrows and data flows by means of dashed arrows.

In one refinement, the sorting installation has a fixed image recorder and also a fixed image evaluation unit. The fixed image recorder produces a computer-accessible depiction of a surface of the mail item while the mail item is passing through the sorting installation. This depiction shows the recipient identifier on the mail item. Preferably, a plurality of depictions of the mail item are produced from different directions, and that depiction is selected or those depictions are selected which show(s) the recipient identifier. It is possible for the data record that is stored in the central database for the mail item to be augmented by this depiction. This facilitates later verification of the condition which the mail item was in when the mail item reached the sorting installation.

In the example in FIG. 1, a fixed camera oKa in the sorting installation Sort records at least one computer-accessible depiction Abb.1 of a surface of the package P. This depiction Abb.1 shows the recipient identifier Add-K and the article identifier GK.

The fixed camera in the sorting installation is connected to a fixed image evaluation unit.

The image evaluation unit attempts to automatically decipher the recipient identifier in the depiction by means of "optical character recognition" (OCR). If this is unsuccessful, one refinement involves the depiction being presented on a screen device, and an operative reads the recipient identifier in the depiction and inputs at least one portion of the recipient identifier, e.g. the zip code ("video coding"). In another refinement, an operative speaks a portion of the recipient identifier, e.g. the destination, into a microphone. By way of example, the operative holds the mail item in his hands, which is done particularly when the mail item is a mail package. A voice recognition system evaluates this voice input. Methods for how automatic character recognition and voice input collaborate are known from U.S. Pat. No. 6,577,749 B1, DE 10064529 C1 and U.S. Pat. No. 6,587,572 B1, for example.

The data record for the mail items is augmented by a coding for the deciphered recipient identifier. The sorting installation initiates the further transport of the mail item to the deciphered destination address.

The fixed image evaluation unit oBae in the example in FIG. 1 evaluates this depiction Abb.1 and deciphers the recipient identifier Add-K in the depiction Abb.1. The data record Ds in the central database Z-Db is augmented by a coding for this deciphered address identifier Add-K. In addition, the time T1 at which the fixed camera oKa has produced the depiction Abb.1 is ascertained. This time T1 is stored in the data record Ds as a time stamp.

In one refinement, the mail item P is provided with a machine-readable article identifier GK. Since the carrier transports mail items from various senders at overlapping times, the carrier preferably allocates the article identifier GK to a mail item rather than the sender. This article identifier distinguishes this mail item from all the other mail items which are being transported by this carrier within a particular period of time. The data record stored in the central database is augmented via coding for the article identifier.

In one refinement, the article identifier GK matches the internal code iK. Preferably, the internal code iK is longer, however, which means that this internal code iK distinguishes the mail item from other mail items over a period of time which is longer than the period of time for the article identifier GK on the mail item itself. In one refinement, a machine-readable coding for the article identifier is printed onto the mail item. By way of example, a bar code or else the article identifier in the form of an alphanumeric character is printed. Alternatively, a tag has the coding of the article identifier printed onto it, and the printed tag is stuck onto the article. This article identifier on the article acts as an optically registerable identification feature, in one refinement as the only identification feature. In the example in FIG. 1, the mail item P is provided with an article identifier "xyz". This article identifier GK comprises alphanumeric characters and can be read both by a human being and automatically by a reader.

In another refinement, the mail item is identified not from a printed article identifier but rather from a plurality of prescribed optically registerable identification features. This refinement avoids the need to provide the mail item itself with an article identifier. Such methods for identifying a mail item without printing an article identifier onto the article have become known by the name "fingerprint" or else "virtual ID" and are described in EP 1222037 B1, DE 102008017191 A1 and DE 102008017190 A1, for example.

In one embodiment of this refinement, the identifier Add-K of the destination address (recipient, postal address) is used as a feature value for the package P. The destination address feature is measured anyway by deciphering the destination address identifier Add-K on the package P in order to be able to transport the package correctly. Further features, in one embodiment, are the position and size and color of the destination identifier Add-K on the package P, and moreover an identifier for the sender (logo, position of the logo, sender address, size of the sender address block or similar features).

However, it is possible for the same recipient to receive a plurality of packages from the same sender on one day or on several successive days. The destination address identifiers on these packages are therefore totally alike, and the identifiers for the sender are also identical. Therefore, the features which have just been described are not sufficient to distinguish these packages from one another. Therefore, a package identifier for the sender, which the sender provides for a package, is used as a further feature. The sender uses this package identifier to distinguish this package P from all the other packages which this sender sends within a particular period of time. Alternatively, the package identifier distinguishes this package P at least from all the other packages which this sender sends to the same recipient or sends to a particular destination area. Such an identifier, e.g. a machine-readable coding or a consecutive number, is allocated by the sender anyway, particularly in order to be able to handle possible complaints from the recipient about damage in transit and also invoices from the transport service provider.

In this embodiment, the combination of the destination address identifier Add-K and the package identifier from the sender identifies the package P clearly.

As already explained, the sorting installation Sort produces at least one computer-accessible depiction Abb.1 of the mail item. A feature value image evaluation unit ascertains for each prescribed identification feature what value this identification feature assumes for this mail item P. For this purpose, the feature value image evaluation unit evaluates the depiction Abb.1 of the mail item. For n prescribed identification features, this approach provides a feature value vector having n feature values. The data record Ds that is stored in the central database Z-Db for the mail item P is augmented by this feature value vector.

Usually, the mail item P passes through a sorting installation again. It would be inexpedient if the already deciphered recipient identifier Add-K were to be deciphered again. Therefore, in one refinement, for each fresh pass through a sorting installation the data record Ds produced for this article P during the first pass is ascertained. This data record is stored in the central database Z-Db and comprises a coding for the recipient identifier Add-K deciphered during the first pass. This stored recipient identifier Add-K is used so that the further sorting installation initiates the further transport of the mail item P.

The further sorting installation through which the mail item P passes during the fresh pass produces a further computer-accessible depiction of the mail item. In one refinement, the article identifier GK on the mail item P is deciphered, and the data record Ds in the central database Z-Db is ascertained using the deciphered article identifier GK. In another refinement, a feature value vector having n feature values is produced again by evaluating the further depiction. This feature value vector is compared with feature value vectors from stored data records in order to ascertain the data record Ds for this mail item P.

In one refinement, upon the first pass through the sorting installation, a machine-readable coding for the destination address (sorting code) is printed onto the mail item. This destination address coding is deciphered upon every further pass in order to decipher the destination address Add-K and to initiate the further transport of the mail item. Since different mail items can be sent to the same destination address or even to the same recipient, however, this destination address coding is not sufficient to clearly identify the mail item. Instead, this requires an internal code iK and a feature value vector and/or a printed article identifier.

The mail item P reaches a delivery station, e.g. a delivery post office, together with other mail items. A mailman transports all the mail items which have reached the delivery station within a prescribed period of time, and the delivery addresses of which are in a prescribed delivery area for the mailman, to their respective delivery addresses and delivers these mail items to the respective recipient in the process. This involves the mailman walking or traveling through a prescribed delivery route. The mailman takes note of prescribed endorsements and types of delivery in the process. In particular, the mailman hands over registered mail, mail items having a mail delivery certificate and similarly important mail items to the respective recipient in person and documents the delivery thereof in verifiable fashion, as described below.

In one preferred refinement, prior to delivery, it is ascertained which mail items reach the delivery station within a particular prescribed period of time, e.g. in the morning on a work day, and need to be delivered by the mailman in the next delivery process. By way of example, a reader in the delivery station reads the respective article identifier on each mail item which reaches the delivery station in the prescribed period of time, and deciphers the article identifier. The delivery route on which this mail item needs to be delivered is ascertained automatically. Alternatively, the sorting installation establishes which mail items are transported from the sorting installation to this delivery station in a particular period of time. For each delivery route which begins in the delivery station, this approach produces a list of article identifiers from mail items which have reached the delivery station and need to be delivered along the delivery route. This list acts as transport process information for the transport process of delivering the mail items on a single path along the delivery route.

The mailman carries a portable digital image recorder. In the example in FIG. 1, the mailman is reaching the destination address Add. The mailman carries a portable camera tKa. This portable camera tKa has a local data memory tDSp.

This portable image recorder tKa has an image recording unit with a lens Li and photoelectric elements, an operating element BE and a data memory tDSp. When the operating element BE is operated, the image recorder tKa produces a computer-accessible depiction Abb of a surface of the mail item P or of another article at which the image recorder is pointed. The portable image recorder tKa stores this computer-accessible depiction Abb in the dedicated local data memory tDSp. In the exemplary embodiment, this local data memory tDSp is blocked against subsequent alterations such that a stored depiction can be erased from the local data memory tDSp and a new depiction can be stored at the memory location being freed by the erasure, but a stored depiction cannot subsequently be altered.

Preferably, the portable image recorder tKa moreover stores, for each depiction Abb, a coding for that time at which the depiction Abb has been produced as a time stamp T2. This stored time stamp T2 is also blocked against subsequent alteration.

In addition, the portable image recorder tKa has an information forwarding interface tIW in order to be able to read and forward stored depictions from the local data memory tDSp. Preferably, this information forwarding interface tIW has an externally accessible plug-in unit into which a data cable can be plugged. This allows depictions to be transferred from the local data memory tDSp of the portable image recorder tKa to a central data memory outside the portable image recorder tKa.

Every mailman who travels or walks for a delivery route carries a portable image recorder. Preferably, the data memory of this portable image recorder stores a computer-accessible list of article identifiers for that mail item which the mailman is intended to deliver along the delivery route in this delivery process. The way in which this list of article identifiers is produced has been described above. The portable image recorder has an internal code. Preferably, the mailman authorizes himself. The mailman likewise has an associated internal code.

The mailman, with a mail item P, reaches that destination address Add to which the identifier Add-K is indicated on the mail item P. The mailman establishes whether the recipient—or another person authorized to receive the mail item—can be found. If this is not the case, the mailman acts in accordance with an endorsement on the mail item. By way of example, the mailman takes the mail item away again and leaves a notification for the recipient.

If the mailman finds the recipient, at least one of the following steps is performed:

The mailman hands over the mail item P to the recipient.
    The recipient signs on a surface of the mail item P, e.g. on a sticker on the mail item.
    The recipient—or the mailman—holds a personal document PA of the recipient on a surface of the mail item. If the mail item P is provided with an article identifier GK, the recipient preferably holds the personal document against that surface of the mail item P on which the article identifier GK has been put, specifically next to the article identifier GK such that the personal document PA does not conceal the article identifier. Preferably, besides the personal document PA and the article identifier GK, it is also necessary to read the recipient identifier Add-K at least in part.

The mailman points the portable image recorder tKa at that surface of the mail item P on which the recipient has signed or against which the personal document PA is being held. The mailman operates the operating element BE on the image recorder tKa. The image recorder tKa produces at least one computer-accessible depiction Abb of the surface of the mail item P.

Preferably, the mailman produces a plurality of computer-accessible shots of the surface of the delivered package P. It is possible for the recipient both to sign on the mail item P and to hold his personal document PA against a surface of the mail item P. It is also possible for the recipient to hold his personal document PA against different surfaces of the mail item in succession and for the mailman to produce a respective depiction of each of these surfaces together with the personal document PA.

The portable image recorder Abb stores the depiction or the depictions of the mail item P in its local data memory tDSp. Preferably, together with each depiction, an identifier for that time T2 at which the portable image recorder tKa has produced the depiction Abb is stored as a time stamp. As already explained, the local data memory tDSp is blocked against subsequent alterations. The depiction Abb of the package P and also a time stamp T2 are stored in the local data memory tDSp of the portable camera tKa. The portable camera tKa produces this time stamp T2 as that time at which the shot Abb was produced.

In the example in FIG. 1, an identity card PA is held against a surface of the package P. The mailman uses the portable digital camera tKa to produce a computer-accessible depiction Abb of that surface of the package P against which the identity card PA is being held. This depiction Abb comprises a depiction PA-Abb of the identity card PA of the recipient, the identity card PA being held against a surface of the package P.

In one refinement, the mail item P has been provided with an article identifier GK before the mailman transports the mail item P to the destination address Add for its recipient. At least one depiction Abb of the mail item P which the mailman produces using the portable image recorder tKa during the delivery shows this article identifier GK.

In one embodiment, the portable image recorder tKa additionally has an image evaluation unit tBae and a display device tAg having a screen. This screen can preferably be folded in and out, as is known from digital cameras.

Figure 3:
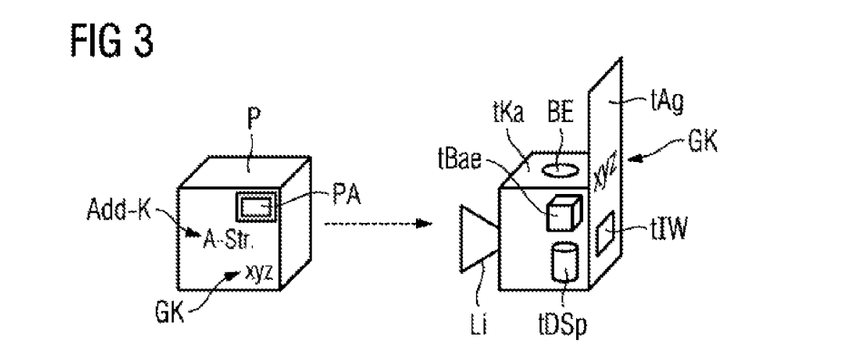
FIG. 3 shows a portable image recorder having a dedicated local display device.

FIG. 3 shows an example of a portable image recorder tKa having a dedicated image evaluation unit tBae and a dedicated display device Ag.

The image evaluation unit tBae of the portable camera evaluates the depiction Abb with the article identifier GK and automatically deciphers the article identifier GK which is shown in the depiction (scrolling). The display device tAg displays the deciphered article identifier on the fold-out screen. In the example in FIG. 3, the portable image recorder tKa displays the deciphered article identifier "xyz" on the display device Ag.

The mailman compares this article identifier which the image recorder tKa displays on the screen with the real article identifier GK on the mail item P. If these two article identifiers match, in one embodiment the mailman inputs a confirmation signal into the portable image recorder tKa. Preferably, the mailman can enlarge ("zoom") or reduce the presentation of the article identifier on the screen of the display device tAg and shift ("scroll") the detail shown from the presentation on the screen. The depiction Abb and the correctly deciphered article identifier GK are stored in the data memory tDSp of the portable image recorder tKa.

In the event of a discrepancy between the actual and deciphered article identifiers, in one embodiment the mailman inputs an error signal and produces a further depiction of a mail item P which shows the article identifier GK. This further depiction is produced from another direction of observation or under different light conditions, for example. Again, the image evaluation unit tBae automatically deciphers the article identifier in the further depiction and presents the deciphering result on the screen. The mailman again compares the presented article identifier with the real article identifier. This sequence is repeated until the image evaluation unit has deciphered the article identifier GK correctly or the mailman has input an abort signal.

It is possible for the portable image recorder tKa to output instructions to the mailman on its screen, e.g. the instruction to produce a depiction again. It is also possible for the portable image recorder tKa itself to produce the error signal, e.g. if the image evaluation unit tBae of the portable image recorder tKa is unable to decipher the article identifier at all or with sufficient certainty.

In one embodiment, the image evaluation unit of the portable image recorder tKa does not use any supplementary information about the mail items. In one preferred embodiment, the image evaluation unit tBae, by contrast, additionally uses the information regarding which mail items the mailman is intended to deliver on his delivery route during this delivery process, that is to say the transport process information described above. The image evaluation unit tBae compares the article identifier in the depiction Abb of the delivered mail item P with the stored article identifiers which are intended to be delivered during this delivery process. This refinement reduces the search space dramatically and reduces the error rate considerably. For this purpose, the image evaluation unit tBae uses a computer-accessible list of the article identifiers of those mail items which are intended to be delivered for this delivery process.

In another embodiment, the portable image recorder tBae has a display device Ag, but not a local image evaluation unit tBae. Following appropriate operation of an operating element BE, the portable image recorder tKa displays each stored depiction on the screen, as is known from commercially available digital cameras. The mailman checks whether the delivery identifier and possibly the article identifier can be seen with sufficient clarity on the presented depiction Abb. If not, the mailman initiates the production of a further depiction of the delivered mail item.

In one refinement, a data memory tDSp of the portable image recorder tKa stores a computer-accessible list of the article identifiers of those mail items which the mailman delivers on his delivery route in this delivery process, that is to say the transport process information. In a development of this refinement, the portable image recorder tKa has the option of selecting an item in a list if this list is presented on the display device Ag of the portable image recorder tKa. The portable image recorder tKa has a suitable operating element in order to select a presented list element. In connection with the process of delivering the mail item and producing the depiction Abb of the mail item, the list of the article identifiers is presented on the screen. The mailman selects from this list the article identifiers of those mail items which the mailman is delivering right now. The selected article identifier is automatically associated with the depiction. The depiction Abb and the article identifier GK are stored in the data memory tDSp of the portable image recorder tKa.

The mailman walks or travels through his delivery route until he has delivered all the mail items—apart from those mail items which prove to be undeliverable. Next, the mailman returns together with the portable image recorder tKa to the delivery station. The local data memory tDSp of the portable image recorder tKa stores depictions of the delivered mail items. These depictions show the delivery identifiers as described above.

The portable image recorder tKa is connected to a fixed data transmission unit oDüe in the delivery station, e.g. by plugging a data cable into the information forwarding interface tIW. The data transmission unit oDüe reads the depictions from the data memory tDSp of the image recorder tKa and transmits these depictions to a database server which is connected to the central database Z-Db. Preferably, at least some of the following information is transmitted to the database server together with each depiction of a mail item:

the automatically deciphered article identifier GK from the mail item P, or the article identifier GK which has been input by the mailman or selected by the mailman, the time T2 at which the depiction Abb of the mail item P was produced (time stamp), a code from the portable image recorder tKa which was used to produce the depiction, a code from the mailman who used the portable image recorder tDSp to produce the depiction Abb.

This information is stored in the data memory tDSp of the portable image recorder tKa together with the depiction Abb and is transmitted together with the depiction.

FIG. 1 illustrates how the depiction Abb of the package P is read from the data memory tDSp of the portable camera tKa and is transmitted to a fixed data transmission unit oDüe using the information forwarding interface tIW. This depiction Abb of the package P comprises a depiction PA-Abb of the identity card PA of the recipient. The data transmission unit oDüe transmits the depiction Abb which has been read to the central database Z-Db. The data record Ds for the package P is augmented by the depiction Abb and by the time stamp T2 at which the portable camera tKa produced the depiction Abb.

The database server comprises an identification unit IdE. This identification unit IdE evaluates the transmitted computer-accessible depiction Abb of the delivered mail item P and establishes, by virtue of the evaluation of the depiction Abb, from which mail item this depiction comes. The identification unit IdE searches the central database Z-Db for the data record Ds for this mail item. The database server augments the data record Ds found by at least one of the following pieces of information:

produced during the delivery of the mail item P, by a coding for the transmitted time stamp T2, by a coding for another delivery annotation.

The identification unit IdE has a fixed image evaluation unit Bae-IdE. In one refinement, this fixed image evaluation unit Bae-IdE deciphers the code from the personal document PA which was held against a surface of the mail item P during the delivery. This personal document PA is shown in that depiction Abb which the mailman produced for the mail item. The data record Ds found for the mail item P is augmented by a coding for this personal document code.

The text below describes how the identification unit IdE identifies the mail item P and ascertains the stored data record Ds for this mail item P.

In one refinement, the mail item P is provided with an article identifier GK. The transmitted depiction Abb which was produced by the portable image recorder tKa shows this article identifier GK on the mail item P. The fixed image evaluation unit of the identification unit IdE evaluates the depiction Abb and deciphers the article identifier GK shown in the depiction Abb. The stored data records in the central database Z-Db each comprise a coding for an article identifier. The identification unit IdE compares the codings of the article identifiers in the data records with the deciphered article identifier and thereby ascertains the data record Ds.

In one refinement, the identification unit IdE does not use any supplementary information in order to decipher the mail item using the transmitted depiction. In one preferred refinement, the identification unit, by contrast, additionally uses the information regarding which mail item should be delivered in which delivery process on which delivery route, that is to say the transport process information for various transport processes.

It has already been explained that a computer accessible list of the article identifiers of all those mail items which are intended to be delivered in a particular delivery process is produced. By way of example, a reader in the delivery station reads the article identifiers of all the mail items which reach the delivery station in a particular period of time. Alternatively, each sorting installation Sort produces the list after the sorting installation Sort has distributed the mail items over their sorting outputs. The identification unit IdE compares the article identifier which has been read by deciphering the depiction of a mail item with the correct list of article identifiers, that is to say the list for this delivery process. In one refinement, the identification unit IdE uses the time stamp T2, the code from the portable image recorder tKa and/or the code from the mailman, which are transmitted together with the depiction Abb, in order to select the correct list of article identifiers for a delivery process.

In another refinement, each stored data record Ds comprises a feature value vector with n feature values for n prescribed identification features. Each feature value vector ("fingerprint") clearly identifies a respective mail item. The fixed image evaluation unit tBae of the identification unit Bae-IdE evaluates the transmitted depiction Abb and uses the evaluation to measure, for each prescribed identification feature, what value this identification feature assumes for the article shown in the depiction. It is possible for the image evaluation unit BaE-IdE of the identification unit to evaluate a plurality of depictions of the same article, e.g. from different directions of observation or under different light conditions. This evaluation results in a feature value vector.

The identification unit IdE compares the feature value vector measured in this manner with the feature value vectors of stored data records. Preferably, this involves restricting a search space, e.g. using the time stamp or the delivery location, in order to be able to restrict the search for stored data records to a subset of all the stored data records. It is possible for the image evaluation unit Bae-IdE to decipher the recipient identifier which is shown in the transmitted depiction Abb and to compare it with stored codings for recipient identifiers.

FIG. 2 indicates an identification unit IdE. A fixed image evaluation unit Bae-IdE of this identification unit IdE searches the central database Z-Db for the data record Ds for the mail item P.

In the refinements described hitherto, the fixed data transmission unit oDüe is located in the delivery station. The mailman walks or travels through his delivery route and concludes the delivery process before the data memory tDSp in the portable image recorder is connected to the fixed data transmission unit oDüe in the delivery station. These refinements allow wired data transmission between the portable image recorder tKa and the central database Z-Db. This wired data transmission usually results in a higher data throughput and in fewer errors than wireless data transmission.

Figure 4:
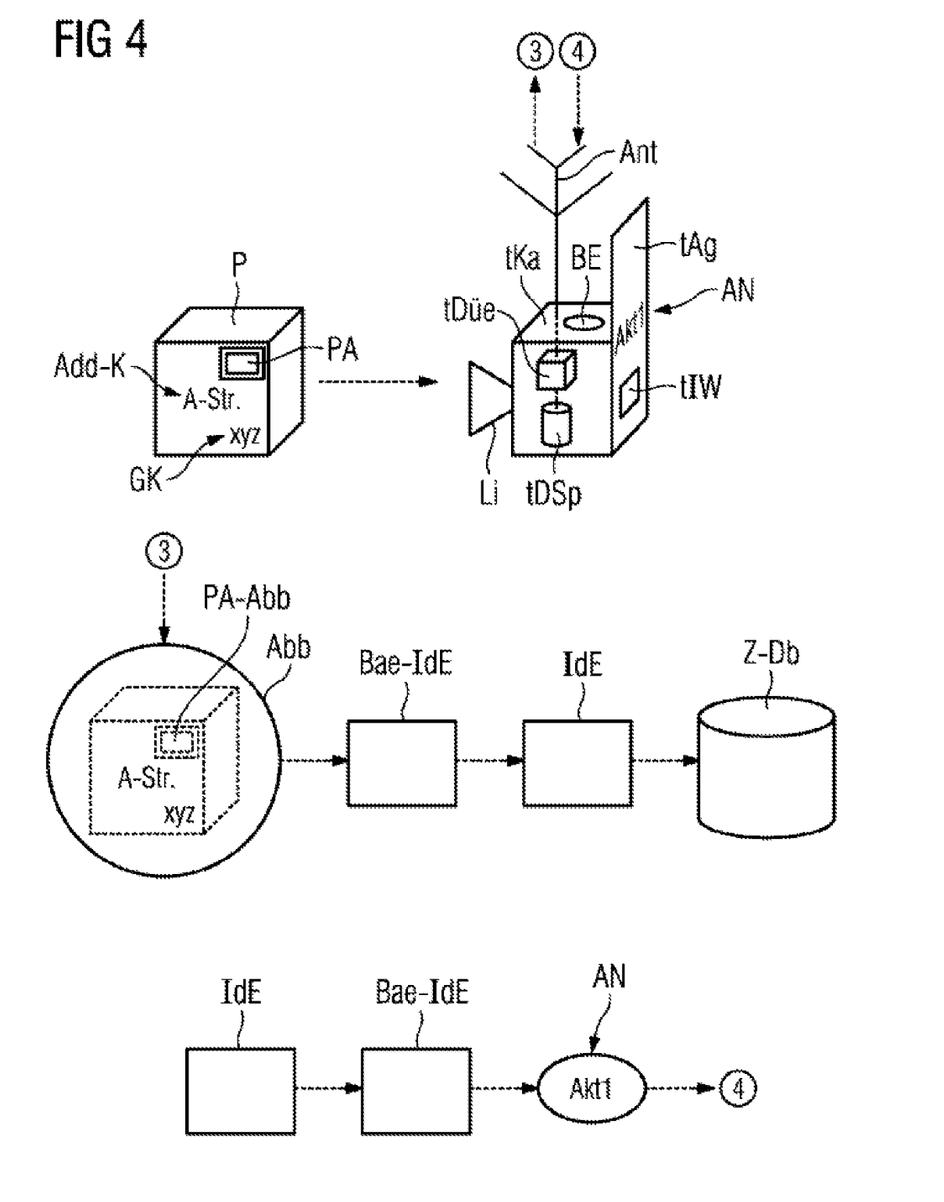
FIG. 4 shows a portable image recorder having a dedicated data transmission unit.

In one modification, the portable image recorder tKa has a dedicated local data transmission unit tale which preferably has an antenna Ant and operates on the basis of a mobile radio standard. FIG. 4 shows this modification. This local data transmission unit tale sets up a wireless data link between the portable image recorder tKa and the central database server with the identification unit IdE. The portable image recorder tKa also has a display device tAg with a screen and an operating element, as described above. A local image evaluation unit tBae in the portable image recorder tKa is not required.

The local data transmission unit tale is activated whenever a mail item has been delivered, specifically after the depiction Abb or the depictions of the mail item P has/have been produced. The local data transmission unit tale transmits the at least one depiction Abb and also preferably the supplementary information (e.g. time stamp T2, code from the portable image recorder tKa and/or code from the mailman) to the central database server.

The identification unit IdE evaluates the depiction Abb and attempts to identify the article P. One option is for the fixed image evaluation unit Bae-IdE of the identification unit Bae-IdE to attempt to decipher the article identifier in the transmitted depiction Abb. Alternatively, the fixed image evaluation unit Bae-IdE produces a feature value vector by evaluating the depiction and compares this feature value vector with stored feature value vectors. In both refinements, the search space is preferably restricted by evaluating the transport process information and by virtue of the identification unit IdE searching only among the data records for those mail items which have been delivered in this delivery process.

The identification unit IdE produces a response message AN. This response message AN is transmitted to the portable image recorder tKa by means of the local data transmission unit tDüe. The portable image recorder tKa presents the response message AN on its local display device tAg. Possible response messages are:

The mail item P was clearly identified.
The mail item P was not clearly identified. Instead, several possible mail items were found.
The depiction Abb could not be evaluated or does not show an article identifier.

In one refinement, a selection containing the article identifiers of the mail items which are still in question is displayed to the mailman on the display device tAg. The mailman selects a displayed article identifier in the selection menu. In this way, it is also possible to have the mailman confirm the clearly identified mail item by virtue of the mailman selecting the only displayed article identifier. The local data transmission unit tale transmits the article identifier selected by the mailman to the database server.

In another embodiment, an action instruction is provided for the mailman, e.g. the instruction to produce a further depiction. This action instruction is presented on the display device tAg. The further depiction, which the mailman then transmits, is also transmitted from the local data transmission unit tale to the database server. In the example in FIG. 4, the response message An additionally comprises an action instruction "Akt 1" to the mailman. This response message AN is presented on the screen of the display device tAg.

List of Reference Symbols

| Reference Sign | Meaning |
|---|---|
| Abb | Computer-accessible depiction of the package P, was produced by the portable camera tKa during the delivery of the package P |
| Abb. 1 | Computer-accessible depiction of the package P, was produced by the fixed camera oKa |
| Add | Destination address for the mail package P |
| Add-K | Identifier for the destination address and the recipient, with which the package P is provided |
| AN | Response message from the local data transmission unit tDue |
| Ant | Antenna of the portable image recorder tKa |
| Bae-IdE | Fixed image evaluation unit of the identification unit IdE |
| BE | Operating element of the portable image recorder tKa |
| Ds | Data record for the package P in the central database Z-Db |
| GK | Article identifier for the package P with the value "xyz" |
| IdE | Identification unit of the sorting installation Sort |
| iK | Internal code for the package P with the value "P123" |
| Li | Lens of the portable image recorder tKa |
| oBae | Fixed image evaluation unit of the sorting installation Sort, evaluates the depiction Abb. 1 |
| oDüe | Fixed data transmission unit, transmits the depiction Abb from the portable camera tKa to the central database Z-Db |
| oKa | Fixed camera of the sorting installation sort |
| P | Mail package which needs to be transported to the destination address Add |
| PA | Identity card of the recipient, is held by a surface of the package P and shown in the depiction Abb |
| PA | Identity card of the recipient of the package P |
| PA-Abb | Computer-accessible depiction of the identity card PA in the depiction Abb of the mail item P |
| RegE | Registration unit of the sorting installation Sort, creates the data record Ds for the package P in the central database Z-Db |
| Sort | Sorting installation for mail packages |
| T1 | Time at which the fixed camera oKa has produced the depiction Abb. 1 |
| T2 | Time at which the portable camera tKa has produced the depiction Abb |
| tAg | Display device of the portable camera tKa |
| tBae | Image evaluation unit of the portable camera tKa |
| tDSp | Local data memory of the portable camera tKa |
| tDüe | Local data transmission unit of the portable image recorder tKa |
| tIW | Information forwarding interface of the portable image recorder tKa |
| tKa | Portable camera of the mailman |
| Z-Db | Central database with data records for mail items, comprises the data record Ds |

The invention claimed is:

1. A method for delivering an article, the article having at least one optically registerable prescribed identification feature and a prescribed destination, which method comprises the steps of:
producing and storing a data record for the article in a central data memory such that the data record containing, for each prescribed identification feature, a respective coding for a value which the prescribed identification feature assumes for the article;
transporting and delivering the article to the prescribed destination;
providing to the article, at least intermittently, an optically registerable delivery identifier at the prescribed destination;
producing, via a portable image recorder, at least one computer-accessible depiction of the article such that the at least one computer-accessible depiction shows the optically registerable delivery identifier;

evaluating the at least one computer-accessible depiction to ascertain, for each prescribed identification feature what the value is assumed by the prescribed identification feature for the article resulting in at least one ascertained identification feature value;

using the at least one ascertained identification feature value to ascertain the data record produced for the article in the central data memory;

augmenting the data record ascertained by a computer-accessible identifier indicating that the article has been delivered; and producing the computer-accessible identifier by using the at least one computer-accessible depiction with the optically registerable delivery identifier.

2. The method according to claim 1, wherein the step of providing the article with the optically registerable delivery identifier further comprises the steps of:

putting onto a surface of the article the at least one optically registerable identifier for a person who receives the article; and producing the at least one computer-accessible depiction of the article such that the computer-accessible depiction contains a computer-accessible depiction of the optically registerable delivery identifier.

3. The method according to claim 2, wherein the step of putting onto the surface of the article the optically registerable delivery identifier further comprises the step of holding a personal document in front of the surface.

4. The method according to claim 1, wherein:

the optically registerable prescribed identification feature is one of a plurality of identification features, one of the identification features is a machine-readable article identifier;

the article is provided with the machine-readable article identifier before the article reaches the prescribed destination; and the computer-accessible depiction of the article is produced by the portable image recorder such that the computer-accessible depiction shows the machine-readable article identifier.

5. The method according to claim 4, which further comprises:

providing the portable image recorder with an image evaluation unit and a display device;

evaluating, via the image evaluation unit, the computer-accessible depiction for ascertaining the machine-readable article identifier; and presenting the machine-readable article identifier on the display device.

6. The method according to claim 5, which further comprises:

checking, via the portable image recorder, after the step of presenting the machine-readable article identifier whether an error signal has been input or a confirmation signal is absent; and if the portable image recorder has established the error signal has been input or the confirmation signal is absent, producing a further computer-accessible depiction of the article and the data record for the article is augmented by the further computer-accessible depiction.

7. The method according to claim 1, which further comprises:

storing intermittently the at least one computer-accessible depiction of the article in a data memory of the portable image recorder resulting in a stored depiction; and transmitting the stored depiction to an image evaluation unit, and the image evaluation unit performs the step of ascertaining the value of the prescribed identification feature.

8. The method according to claim 1, wherein the step of augmenting the data record for the article by the computer-accessible identifier for the delivery further comprises at least one of the steps of:

augmenting the data record ascertained by the at least one computer-accessible depiction which shows the computer-accessible delivery identifier; or augmenting the data record ascertained by a further depiction which has been produced by using the computer accessible depiction of the article and shows the delivery identifier.

9. The method according to claim 1, which further comprises:

transporting in a single transport process the article together with at least one further article and for the further article a respective further destination is prescribed, and in the single transport process the article and the further article are transported to a respective prescribed destination;

ascertaining a piece of transport process information, wherein the transport process information specifies which articles are transported by the single transport process; and producing and storing for each of the article and the further article a respective data record in the central data memory, an ascertainment of the data record for the article which is transported in the single transport process involves a performance of a search space restriction to the data records of the articles which are specified in the transport process information.

* * * * *